United States Patent
Jiang et al.

(10) Patent No.: US 9,265,064 B2
(45) Date of Patent: Feb. 16, 2016

(54) METHOD AND SYSTEM FOR TRANSMITTING CHANNEL FEEDBACK INFORMATION

(75) Inventors: Anming Jiang, Shenzhen (CN); Kaiying Lv, Shenzhen (CN); Jing Jiang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 121 days.

(21) Appl. No.: 14/131,360

(22) PCT Filed: Mar. 20, 2012

(86) PCT No.: PCT/CN2012/072636
§ 371 (c)(1),
(2), (4) Date: Jan. 7, 2014

(87) PCT Pub. No.: WO2012/155649
PCT Pub. Date: Nov. 22, 2012

(65) Prior Publication Data
US 2014/0146751 A1    May 29, 2014

(30) Foreign Application Priority Data

Jul. 12, 2011    (CN) .......................... 2011 1 0194124

(51) Int. Cl.
*H04W 72/12* (2009.01)
*H04W 24/08* (2009.01)
*H04L 1/00* (2006.01)

(52) U.S. Cl.
CPC ......... *H04W 72/1289* (2013.01); *H04L 1/0027* (2013.01); *H04W 24/08* (2013.01)

(58) Field of Classification Search
None
See application file for complete search history.

(56) References Cited

U.S. PATENT DOCUMENTS 7,990,872 B2    8/2011    Ahn
2005/0286437 A1*    12/2005    Matsushita et al. ........... 370/252
(Continued)

FOREIGN PATENT DOCUMENTS

CN    1735016 A    2/2006
CN    102007723 A    4/2011
(Continued)

OTHER PUBLICATIONS

International Search Report in international application No. PCT/CN2012/072636, mailed on Jul. 12, 2012.
(Continued)

*Primary Examiner* — Michael Thier
*Assistant Examiner* — Yaotang Wang
(74) *Attorney, Agent, or Firm* — Oppedahl Patent Law Firm LLC

(57) ABSTRACT

The disclosure provides a method and system for transmitting channel feedback information. The method includes: a transmitting station transmits, after obtaining a Transmission Opportunity (TXOP), a radio frame to a receiving station to request the receiving station to transmit channel feedback information; and the receiving station transmitting, after receiving the radio frame transmitted by the transmitting station, a radio frame including channel feedback information to the transmitting station, wherein a transmission end time of the radio frame including channel feedback information is allowed to exceed an end time set by a transmission time threshold of the TXOP. The technical solution of the disclosure solves the technical problem that the transmitter is unable to timely obtain channel feedback information from the receiver, enabling the transmitter to timely obtain the channel feedback information from the receiver even in the condition that the transmitter cannot estimate a data volume and a rate of the channel feedback information fed back from the receiving station and whether the time for feeding back the channel feedback information by the receiver would exceed the transmission time threshold value or not.

12 Claims, 1 Drawing Sheet

(56) References Cited

U.S. PATENT DOCUMENTS

| | | | |
|---|---|---|---|
| 2008/0186945 A1 | 8/2008 | Ahn | |
| 2008/0232339 A1* | 9/2008 | Yang et al. | 370/342 |
| 2009/0059949 A1* | 3/2009 | Singh | H04W 72/1221 |
| | | | 370/447 |
| 2009/0252143 A1 | 10/2009 | Sridhara et al. | |
| 2010/0214169 A1* | 8/2010 | Kafle | 342/368 |
| 2011/0044298 A1* | 2/2011 | Wentink et al. | 370/336 |

FOREIGN PATENT DOCUMENTS

| | | |
|---|---|---|
| JP | 2007235782 A | 9/2007 |
| JP | 2008524898 A | 7/2008 |
| JP | 2009523372 A | 6/2009 |
| JP | 2009540688 A | 11/2009 |
| WO | 2007015529 A1 | 2/2007 |

OTHER PUBLICATIONS

English Translation of the Written Opinion of the International Search Authority in international application No. PCT/CN2012/072636, mailed on Jul. 12, 2012.

* cited by examiner

METHOD AND SYSTEM FOR TRANSMITTING CHANNEL FEEDBACK INFORMATION

TECHNICAL FIELD

The disclosure relates to the field of communications, and in particular to a method and system for transmitting channel feedback information.

BACKGROUND

At present, a Wireless Local Access Network (WLAN) develops quickly in the wireless network field, with growing demands on WLAN coverage and higher demand WLAN throughput. Institute of Electrical and Electronic Engineers (IEEE802.11) successively defines a series of most common WLAN technical standards (such as 802.11a, 802.11b, 802.11g and the like); subsequently, other task groups appear one after another to be committed to developing standards involved in improvement of existing 802.11 technology, for example, task group 802.11n proposes a requirement of High Throughput (HT), which supports a data rate up to 600 Mbps; task group 802.11ac further proposes a concept of Very High Throughput (VHT), which increases the data rate to 1 Gbps by introducing a greater channel bandwidth.

According to the IEEE802.11, one Access Point (AP) and multiple Stations (STAs) associated with this AP form a Basic Service Set (BSS).

The IEEE802.11 defines two operation modes: a Distributed Coordination Function (DCF) and a Point Coordination Function (PCF), and also defines improvements aiming at the two operation modes: an Enhanced Distributed Channel Access (EDCA) function and a Hybrid Coordination Function Controlled Channel Access (HCCA) function. The DCF is the most basic operation mode, which enables multiple stations to share one radio channel by adopting a Carrier Sense Multiple Access with Collision Avoidance (CSMA/CA) mechanism. The EDCA function is an enhanced operation mode, which enables multiple access categories of different priorities to share one radio channel by adopting the CSMA/CA mechanism and appoints a Transmission Opportunity (TXOP), that is, transmission duration (TXOP Duration). Each priority queue with QoS requirements has a transmission time limit (TXOP limit) parameter respectively. The TXOP limit indicates the maximum transmission duration corresponding to the TXOP obtained by the priority queue. A Transmission Network Allocation Vector counter (TXNAV Timer) is set while the transmission time is appointed, and the initial value is set to TXOP Duration. The TXOP Duration is set according to the transmission duration, which must be less than or equal to the TXOP limit. The initial time set by the TXOP limit and the TXNAV Timer is called a transmission time threshold.

In the related art, a new frame switch sequence is defined for measurement of channel information; specifically, a transmitting station transmits a Null Data Packet Announcement (NDPA) frame for measurement of channel, and transmits a Null Data Packet (NDP) frame after a Short Interframe Space (SIFS) upon the end of transmission of NDPA frame; then, the first station indicated by the default NDPA frame replies channel feedback information (Sounding Feedback) after an SIFS upon the complete of receiving of the NDPA frame and the NDP frame. If there are multiple receiving stations, except the first station which feeds back information by default, other receiving stations wait a Beamforming Report Poll from the transmitting station to transmit channel feedback information, as shown in FIG. 1.

The measurement of channel information performed by the above stations is very important for both parties of communication. The purpose of this process is to ensure both parties of communication to efficiently perform subsequent data service communications. According to the related art, generally, when a transmitter and a receiver are performing communications, the transmitter would not transmit a frame unless it estimates that the sum of the duration needed to transmit the frame, the duration needed to transmit a response frame by the receiver and the necessary interframe interval does not exceed the transmission time threshold. However, for the measurement process of channel information, a data volume and a data transmission rate of the channel feedback information fed back by the receiving station would differ depending on different channel conditions; in this way, the transmitter cannot estimate the data volume and rate of the channel feedback information fed back by the receiving station, and thus cannot learn whether the time for feeding backing the channel feedback information by the receiver would exceed the transmission time threshold or not. If at this time the transmitter does not transmit a radio frame to request the receiver to feed back channel feedback information, the transmitter cannot obtain the channel feedback information timely.

SUMMARY

In view of the above, the main purpose of the disclosure is to provide a method and system for transmitting channel feedback information, for solving the technical problem that a transmitter is unable to timely obtain channel feedback information from a receiver.

In order to achieve the above purpose, the technical scheme of the disclosure is realized as follows.

A method for transmitting channel feedback information is provided, which includes:

a transmitting station transmitting, after obtaining a Transmission Opportunity (TXOP), a radio frame to a receiving station to request the receiving station to transmit channel feedback information; and the receiving station transmitting, after receiving the radio frame transmitted by the transmitting station, a radio frame including channel feedback information to the transmitting station, wherein a transmission end time of the radio frame including channel feedback information is allowed to exceed an end time set by a transmission time threshold of the TXOP.

Preferably, the radio frame including channel feedback information transmitted by the receiving station may include partial or all channel feedback information.

Preferably, an end time pointed by a preset time included in the radio frame transmitted by the transmitting station may be allowed to exceed an end time pointed by a transmission time limit (TXOP Limit). Further, an end time of transmitting the radio frame including channel feedback information by the receiver may be allowed to exceed the end time pointed by the preset time.

Preferably, the method may further include: after complete of transmission of previous channel feedback information, and when a current time does not exceed the end time pointed by the transmission time threshold, the transmitting station continues transmitting a radio frame to request a current station or other stations to transmit channel feedback information.

Preferably, after complete of transmission of previous channel feedback information, and when a transmission end time of transmitting a radio frame for requesting channel feedback information does not exceed an end time pointed by a transmission time threshold, the transmitting station may transmit a radio frame to the current station or other stations to request the current station or other stations to transmit channel feedback information.

Preferably, the radio frame transmitted to the receiving station by the transmitting station may be an NDPA frame and an NDP frame, or a Beamforming Report Poll frame.

Based on the method embodiment of the disclosure, a system for transmitting channel feedback information is provided, which includes a transmitting station and one or more receiving stations, wherein the transmitting station is configured to transmit, after obtaining a Transmission Opportunity (TXOP), a radio frame to the receiving station to request the receiving station to transmit channel feedback information; and the receiving station is configured to transmit, after receiving the radio frame transmitted by the transmitting station, a radio frame including channel feedback information to the transmitting station, wherein a transmission end time of the radio frame including channel feedback information is allowed to exceed an end time set by a transmission time threshold of the TXOP.

The technical scheme of the disclosure allows the transmission end time of the radio frame including channel feedback information to exceed the end time set by the transmission time threshold, enabling the transmitter to timely obtain the channel feedback information from the receiver even in the condition that the transmitter cannot estimate a data volume and a rate of the channel feedback information fed back from the receiving station and whether the time for feeding back the channel feedback information by the receiver would exceed the transmission time threshold value or not, and enabling a successful communication between the transmitter and the receiver.

DETAILED DESCRIPTION

Figure 1:
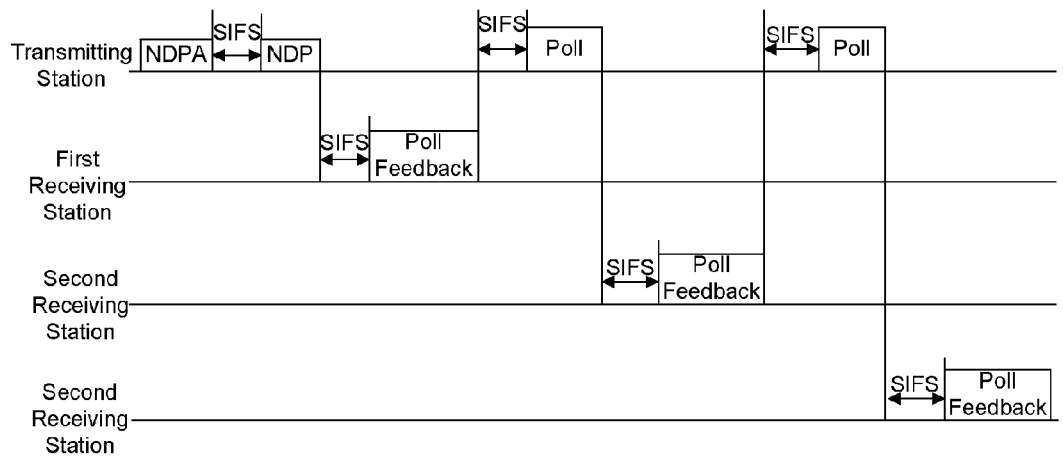
FIG. 1 shows a diagram of an existing feedback process of channel feedback information.
Figure 2:
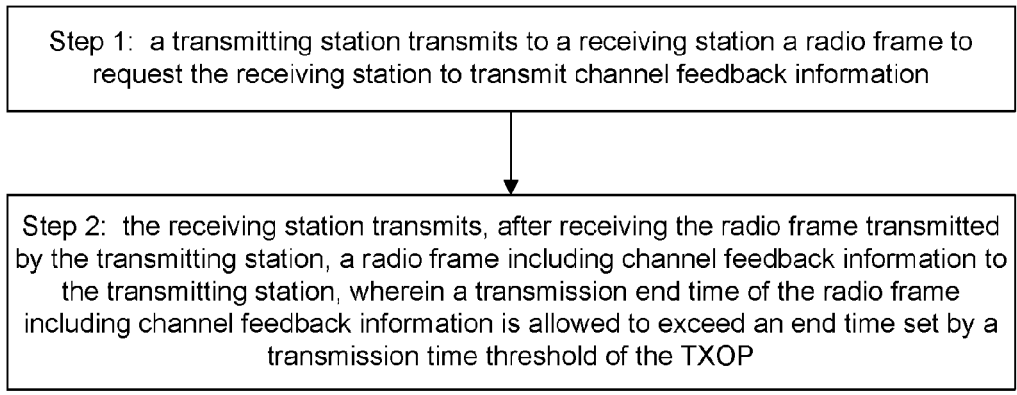
FIG. 2 shows a flowchart of a method for transmitting channel feedback information according to the disclosure.

The basic idea and the implementation process of a method for transmitting channel feedback information provided by the disclosure are shown in FIG. 2, which specifically includes the following steps:

Step 1: a transmitting station transmits to a receiving station a radio frame to request the receiving station to transmit channel feedback information.

Step 2: the receiving station transmits, after receiving the radio frame transmitted by the transmitting station, a radio frame including channel feedback information to the transmitting station, wherein a transmission end time of the radio frame including channel feedback information is allowed to exceed an end time set by a transmission time threshold of the TXOP.

The technical scheme of the disclosure avoids the limit on the feedback of channel feedback information caused by the transmission time threshold in the related art, enabling the transmitter to timely obtain the channel feedback information from the receiver even in the condition that the transmitter cannot estimate whether the time for feeding back the channel feedback information by the receiver would exceed the transmission time threshold value or not.

For a better understanding of the purpose, technical scheme and advantages of the disclosure, embodiments are provided below to further illustrate the disclosure in detail by reference to the accompanying drawings.

Embodiment 1

Station A (transmitting station) communicates with one or more stations (receiving stations).

Step 101: the station A transmits an NDPA frame and transmits an NDP frame after an SIFS upon the end of transmission of NDPA frame to request the receiving station to transmit channel feedback information within a preset time.

Step 102: a first receiving station indicated by the NDPA frame feeds back channel feedback information to the station A by default after an SIFS upon the end of receiving of NDPA frame and NDP frame.

The preset time included in the NDPA frame is the time for feeding back channel feedback information by the receiving station. Since the disclosure allows an end time pointed by the preset time to exceed an end time pointed by a TXOP limit, the transmission of this channel feedback information is not limited by the TXOP limit.

If the time exceeds the TXOP limit when the first receiving station completes transmitting the channel feedback information, the station A does not transmit a Beamforming Report Poll to a second station.

Embodiment 2

Station A (transmitting station) communicates with one or more stations (receiving stations).

Step 201: the station A transmits an NDPA frame and transmits an NDP frame after an SIFS upon the end of transmission of NDPA frame to request the receiving station to transmit channel feedback information within a preset time.

Step 202: a first receiving station indicated by the NDPA frame feeds back channel feedback information to the station A by default after an SIFS upon the end of receiving of NDPA frame and NDP frame.

Step 203: when the first receiving station completes feeding back the channel feedback information, if the time does not exceed an end time pointed by a TXOP limit after an SIFS, or if the current time does not exceed the end time pointed by the TXOP limit and the station A confirms, after waiting an SIFS, that the rest TXOP duration is not less than the transmission duration of a Beamforming Report Poll, then the station A transmits a Beamforming Report Poll to a second receiving station to request the second receiving station to transmit channel feedback information.

Step 204: the second receiving station receives the Beamforming Report Poll and feeds back channel feedback information to the station A after waiting an SIFS.

The preset time included in the Beamforming Report Poll frame is the time for feeding back channel feedback information by the receiving station. Since the end time pointed by the preset time is allowed to exceed the end time pointed by the TXOP limit, the transmission of this channel feedback information is not limited by the TXOP limit.

If the time does not exceed the end time pointed by the TXOP limit when the second receiving station completes transmitting the channel feedback information, the station A continues to transmit a Beamforming Report Poll to a third receiving station to request the third receiving station to feed back channel feedback information; otherwise, the station A does not transmit a Beamforming Report Poll after the second receiving station completes transmission.

Embodiment 3

Station A (transmitting station) communicates with one or more stations (receiving stations).

Step 301: the station A transmits an NDPA frame and transmits an NDP frame after an SIFS upon the end of transmission of NDPA frame to request the receiving station to transmit channel feedback information within a preset time.

Step 302: a first receiving station indicated by the NDPA frame feeds back channel feedback information to the station A by default after an SIFS upon the end of receiving of NDPA frame and NDP frame.

Step 303: when certain receiving station completes feeding back the channel feedback information, in the condition that this receiving station is needed to retransmit partial or all channel feedback information, if the time does not exceed an end time pointed by a TXOP limit after an SIFS or a Point Coordination Function Interframe Space (PIFS), or if the current time does not exceed the end time pointed by the TXOP limit and the station A confirms, after waiting an SIFS or a PIFS, that the rest TXOP duration is not less than the transmission duration of a Beamforming Report Poll, the station A transmits a Beamforming Report Poll to this receiving station to request the this receiving station to transmit channel feedback information.

Step 304: this receiving station receives the Beamforming Report Poll and feeds back channel feedback information to the station A after waiting an SIFS.

The preset time included in the Beamforming Report Poll frame is the time for feeding back channel feedback information by the receiving station. Since the end time pointed by the preset time is allowed to exceed the end time pointed by the TXOP limit, the transmission of this channel feedback information is not limited by the TXOP limit.

Step 305: if the time does not exceed the end time pointed by the TXOP limit when this receiving station completes transmitting the channel feedback information, the station A continues to transmit a Beamforming Report Poll to a next receiving station to request the next receiving station to feed back channel feedback information; otherwise, the station A does not transmit a Beamforming Report Poll after this receiving station completes retransmission.

It should be noted that, since TXOP Duration is less than or equal to the value of the TXOP limit, the TXOP limit referred in the above three embodiments also can be TXNAV Timer or TXOP Duration.

Embodiment 4

Station A (transmitting station) communicates with one or more stations (receiving stations).

Step 401: the station A transmits an NDPA frame and transmits an NDP frame after an SIFS upon the end of transmission of NDPA frame to request the receiving station to transmit channel feedback information within a preset time.

Step 402: a first receiving station indicated by the NDPA frame feeds back channel feedback information to the station A by default after an SIFS upon the end of receiving of NDPA frame and NDP frame.

The preset time included in the radio frame transmitted by the station A is set according to the estimation of time used to feed back channel information by the receiving station, and the preset time is allowed to exceed a TXOP Limit. The station A has a TXNAV Timer, of which the initial time is set to the preset time, that is, TXOP Duration; when the Timer is 0, the receiving station still is allowed to transmit channel feedback information.

Embodiment 5

Based on the above method embodiments, this embodiment of the disclosure also provides a system for transmitting channel feedback information, which includes one transmitting station and one or more receiving stations mentioned in the above method embodiment, wherein the transmitting station is configured to transmit a radio frame to the receiving station to request the receiving station to transmit channel feedback information; and the receiving station is configured to transmit, after receiving the radio frame transmitted by the transmitting station, a radio frame including channel feedback information to the transmitting station, wherein a transmission end time of the radio frame including channel feedback information is allowed to exceed an end time set by the transmission time threshold.

Since the system embodiment is implemented based on the above method embodiments, the transmitting station and the receiving station included in the system are provided for implementing the above method embodiments, and the function thereof can be learned from the steps in the above method embodiments. In order to save space, no further description is needed here.

The above are the preferred embodiments of the disclosure only, and are not intended to limit the scope of protection of the disclosure.

INDUSTRIAL APPLICABILITY

The disclosure allows a transmission end time of a radio frame including channel feedback information to exceed an end time set by a transmission time threshold, enabling a transmitter to timely obtain channel feedback information from a receiver even in the condition that the transmitter cannot estimate a data volume and a rate of the channel feedback information fed back from the receiving station and whether the time for feeding back the channel feedback information by the receiver would exceed the transmission time threshold value or not, and enabling a successful communication between the transmitter and the receiver.

The invention claimed is:

1. A method for transmitting channel feedback information, comprising:
    after obtaining a Transmission Opportunity (TXOP), transmitting, by a transmitting station, a radio frame to a receiving station to request the receiving station to transmit channel feedback information; and
    after receiving the radio frame transmitted by the transmitting station, transmitting, by the receiving station, a radio frame including channel feedback information to the transmitting station, wherein a transmission end time of the radio frame including channel feedback information is allowed to exceed an end time set by a transmission time threshold of the TXOP;
    receiving, by the transmitting station, the radio frame including channel feedback information from the receiving station even in a condition that the transmission end time of the radio frame including channel feedback information exceeds the end time set by the transmission time threshold of the TXOP, wherein an end time pointed by a preset time included in the radio frame transmitted by the transmitting station is allowed to exceed an end time pointed by a transmission time limit (TXOP Limit).

2. The method according to claim 1, wherein the radio frame including channel feedback information transmitted by the receiving station includes partial or all channel feedback information.

3. The method according to claim 1, wherein an end time of transmitting the radio frame including channel feedback information by the receiver is allowed to exceed the end time pointed by the preset time.

4. The method according to claim 1, further comprising:
after complete of transmission of previous channel feedback information, and when a current time does not exceed the end time pointed by the transmission time threshold, continuing, by the transmitting station, transmitting a radio frame to request a current station or other stations to transmit channel feedback information.

5. The method according to claim 4, further comprising:
after complete of transmission of previous channel feedback information, and when a transmission end time of transmitting a radio frame for requesting channel feedback information does not exceed an end time pointed by a transmission time threshold, transmitting, by the transmitting station, a radio frame to the current station or other stations to request the current station or other stations to transmit channel feedback information.

6. The method according to claim 1, wherein the radio frame transmitted to the receiving station by the transmitting station is a Null Data Packet Announcement (NDPA) frame and a Null Data Packet (NDP) frame, or a Beamforming Report Poll frame.

7. A system for transmitting channel feedback information, including a transmitting station and one or more receiving stations, wherein
the transmitting station is configured to transmit, after obtaining a Transmission Opportunity (TXOP), a radio frame to the receiving station to request the receiving station to transmit channel feedback information; and
the receiving station is configured to transmit, after receiving the radio frame transmitted by the transmitting station, a radio frame including channel feedback information to the transmitting station, wherein a transmission end time of the radio frame including channel feedback information is allowed to exceed an end time set by a transmission time threshold of the TXOP;
the transmitting station is further configured to receive the radio frame including channel feedback information from the receiving station even in a condition that the transmission end time of the radio frame including channel feedback information exceeds the end time set by the transmission time threshold of the TXOP, wherein an end time pointed by a preset time included in the radio frame transmitted by the transmitting station is allowed to exceed an end time pointed by a transmission time limit (TXOP Limit).

8. The system according to claim 7, wherein the radio frame including channel feedback information transmitted by the receiving station includes partial or all channel feedback information.

9. The system according to claim 7, wherein an end time of transmitting the radio frame including channel feedback information by the receiver is allowed to exceed the end time pointed by the preset time.

10. The system according to claim 7, wherein after complete of transmission of previous channel feedback information, and when a current time does not exceed the end time pointed by the transmission time threshold, the transmitting station is configured to continue transmitting a radio frame to request a current station or other stations to transmit channel feedback information.

11. The system according to claim 10, wherein after complete of transmission of previous channel feedback information, and when a transmission end time of transmitting a radio frame for requesting channel feedback information does not exceed an end time pointed by a transmission time threshold, the transmitting station is configured to transmit a radio frame to the current station or other stations to request the current station or other stations to transmit channel feedback information.

12. The system according to claim 7, wherein the radio frame transmitted to the receiving station by the transmitting station is a Null Data Packet Announcement (NDPA) frame and a Null Data Packet (NDP) frame, or a Beamforming Report Poll frame.

* * * * *